United States Patent
Zhan

(10) Patent No.: US 10,572,403 B1
(45) Date of Patent: Feb. 25, 2020

(54) COMPLEX PROGRAMMABLE LOGIC DEVICE WITH CAPABILITY OF PERFORMING MULTI-ADDRESS RESPONSE AND OPERATION METHOD THEREOF

(71) Applicants: Inventec (Pudong) Technology Corporation, Shanghai (CN); INVENTEC CORPORATION, Taipei (TW)

(72) Inventor: Peng Zhan, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/566,066

(22) Filed: Sep. 10, 2019

(30) Foreign Application Priority Data

Aug. 30, 2019 (CN) .......................... 2019 1 0815199

(51) Int. Cl.
  *G06F 13/16* (2006.01)
  *G06F 13/42* (2006.01)

(52) U.S. Cl.
  CPC ...... *G06F 13/1668* (2013.01); *G06F 13/4282* (2013.01); *G06F 2213/0016* (2013.01)

(58) Field of Classification Search
  CPC ............ G06F 13/1668; G06F 13/4282; G06F 2213/0016
  See application file for complete search history.

(56) References Cited

U.S. PATENT DOCUMENTS

| 8,423,848 B2* | 4/2013 | Pan | H04L 43/50 |
| | | | 714/734 |
| 9,146,797 B2* | 9/2015 | Messer | G06F 11/0745 |
| 2017/0235519 A1* | 8/2017 | Qiu | G06F 3/0688 |
| | | | 710/313 |
| 2018/0300273 A1* | 10/2018 | Lambert | G06F 13/364 |

* cited by examiner

*Primary Examiner* — Steven G Snyder
*Assistant Examiner* — Christopher Daley
(74) *Attorney, Agent, or Firm* — Locke Lord LLP; Tim Tingkang Xia, Esq.

(57) ABSTRACT

A complex programmable logic device with capability of performing multi-address response includes a I²C slave circuit, a first multiplexer, a plurality of second multiplexers and a plurality of register circuits. The I²C slave circuit outputs an address message and an input data by analyzing a data flow. The address message is responsive to one of a plurality of predetermined addresses, and the I²C slave circuit outputs the predetermined address to which the address message is responsive as an address command as well as the input data. The first multiplexer outputs the input data to a respective one of the plurality of second multiplexers according to the address command. The second multiplexer received the input data accesses to a register unit included in a respective one of the register circuits according to the input data.

7 Claims, 2 Drawing Sheets

COMPLEX PROGRAMMABLE LOGIC DEVICE WITH CAPABILITY OF PERFORMING MULTI-ADDRESS RESPONSE AND OPERATION METHOD THEREOF

CROSS-REFERENCE TO RELATED APPLICATIONS

This non-provisional application claims priority under 35 U.S.C. § 119(a) on Patent Application No(s). 201910815199.6 filed in China on Aug. 30, 2019, the entire contents of which are hereby incorporated by reference.

BACKGROUND

1. Technical Field

The disclosure relates to a complex programmable logic device, more particularly to a complex programmable logic device having the capability of performing a multi-address response.

2. Related Art

Currently, many functions of a server can be implemented in a complex programmable logic device due to application flexibility and modifiability of the complex programmable logic device. The complex programmable logic device in the server integrates slave modules such as PCA 9555, $I^2C$ ROM and $I^2C$ switch, etc.

However, a huge resource consumption of the complex programmable logic device is inevitable if the application of each of those modules needs an independent $I^2C$ slave module. As a result, the costs as well as the number of codes of the complex programmable logic device would be increased. Therefore, in the related art, it is necessary to develop a low-cost complex programmable logic device with a low resource consumption.

SUMMARY

A complex programmable logic device with capability of performing multi-address response is disclosed according to one embodiment of the present disclosure. The complex programmable logic device includes a $I^2C$ slave circuit, a first multiplexer, a plurality of second multiplexers and a plurality of register circuits. The $I^2C$ slave circuit is configured to analyze a data flow sent from a baseboard management controller for generating an address message and an input data, with the address message responsive to one of a plurality of predetermined addresses, and the $I^2C$ slave circuit outputting the predetermined address to which the address message is responsive as an address command and outputting the input data. The first multiplexer has a first control terminal, a first input terminal and a plurality of first output terminals, with the first control terminal and the first input terminal electrically connected to the $I^2C$ slave circuit, the first input terminal configured to receive the input data, and the first control terminal configured to receive the address command, each of the plurality of first output terminals having two output ends. Each of the plurality of second multiplexers has a second control terminal, a second input terminal and a plurality of second output terminals, with the second control terminal electrically connected to one of the two output ends of a respective one of the plurality of first output terminals, and the second input terminal electrically connected to the other one of the two output ends of the respective first output terminal. Each of the plurality of register circuits comprises a plurality of register units and is electrically connected to a respective one of the plurality of second multiplexers, with each of the plurality of register units electrically connected to a respective one of the plurality of second output terminals of the respective second multiplexer. The first multiplexer links the first input terminal and one of the plurality of first output terminals according to the address command so as to send the input data to one of the plurality of second multiplexers, and the second multiplexers, which receives the input data, links the second input terminal and one of the plurality of second output terminals according to the input data, so that one of the plurality of register units of the register circuit connected to the second multiplexer which receives the input data is accessed.

An operation method of a complex programmable logic device with capability of performing multi-address response is disclosed according to one embodiment of the present disclosure. The operation method includes the steps of analyzing a data flow sent from a baseboard management controller for generating an input data and an address message by a $I^2C$ slave circuit, with the input data comprising a control instruction, and the address message responsive to one of a plurality of predetermined addresses; outputting the predetermined address to which the address message is responsive as an address command and outputting the input data by the $I^2C$ slave circuit; linking a first input terminal and one of a plurality of first output terminals of a first multiplexer according to the address command for sending the control instruction of the input data to a second control terminal of one of a plurality of second multiplexers by the first multiplexer, wherein each of the plurality of second multiplexers is electrically connected to a respective one of a plurality of register circuits; and linking a second input terminal and one of a plurality of second output terminals of the second multiplexer which receives the input data according to the control instruction for accessing one of a plurality of register units in the register circuit connected to the second multiplexer which receives the input data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
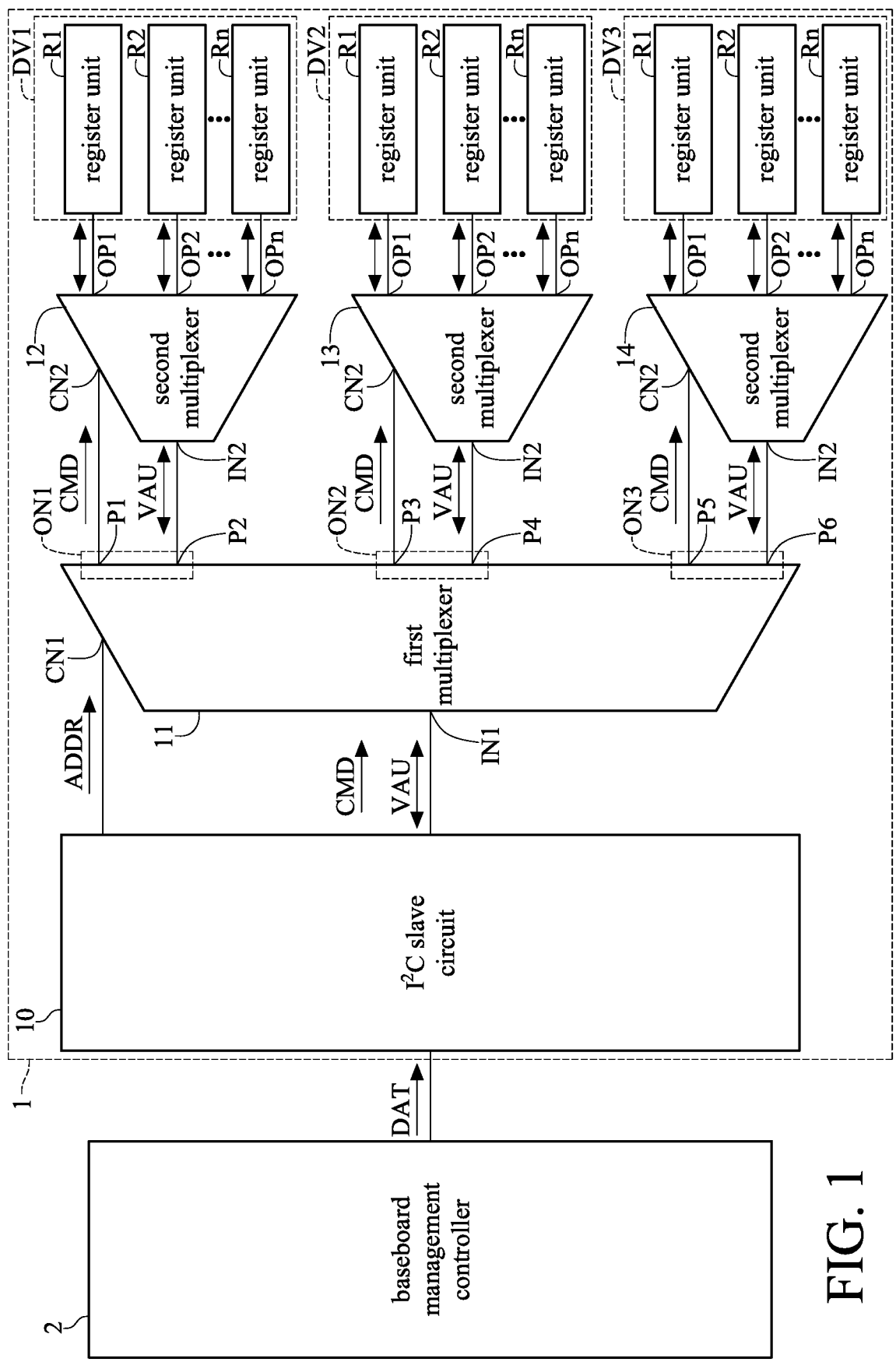
FIG. 1 is a block diagram of a complex programmable logic device with capability of performing a multi-address response according to one embodiment of the present disclosure.

Please refer to FIG. 1, which is a block diagram of a complex programmable logic device with capability of performing a multi-address response according to one embodiment of the present disclosure. As shown in FIG. 1, the complex programmable logic device 1 includes an inter-integrated circuit (I²C) slave circuit 10, a first multiplexer 11, a plurality of second multiplexers 12-14 and a plurality of register circuits DV1-DV3. The complex programmable logic device 1 is connected to a baseboard management controller 2, and the I²C slave circuit 10 is configured to analyze a data flow DAT sent from the baseboard management controller 2 for generating an address message and an input data (not shown in figures). The number of the second multiplexers and the number of the register circuits in the embodiment are merely for illustrations, and the present disclosure is not limited to the numbers of the second multiplexers and the register circuits.

In this embodiment, the address message, generated by analyzing the data flow DAT, is responsive to one of a plurality of predetermined address. The I²C slave circuit 10 outputs the predetermined address to which the address message is responsive as an address command and also outputs the input data. Specifically, a plurality of predetermined addresses (e.g. ADDR1-ADDR5) are preset within the I²C slave circuit 10. When the I²C slave circuit 10 obtains the address message by analyzing the data flow DAT, the I²C slave circuit 10 would determine which one of the predetermined addresses the address message included in the data flow DAT is responsive (or corresponding) to and then output the predetermined address to which the address message is responsive (or corresponding), with the outputted predetermined address serving as the address command. In other words, the predetermined address to which the address message is responsive and the address message have the same (identical) address. For example, assume that the address message included in the data flow DAT is responsive (or corresponding) to the predetermined address ADDR1, the I²C slave circuit 10 records the predetermined address ADDR1 and outputs the predetermined address ADDR1 as the address command ADDR.

The first multiplexer 11 has a first control terminal CN1, a first input terminal IN1 and a plurality of first output terminals ON1-ON3. Both of the first control terminal CN1 and the first input terminal IN1 are electrically connected to the I²C slave circuit 10. The first input terminal IN1 is configured to receive the input data, and the first control terminal CN1 is configured to receive the address command ADDR.

Each of the second multiplexers 12-14 has a second control terminal CN2, a second input terminal IN2 and a plurality of second output terminals OP1-OPn. The second control terminal CN2 is electrically connected to an output end of a respective one of the plurality of first output terminals, and the second input terminal IN2 is electrically connected to the other output end of the respective one of the plurality of first output terminals. In other words, each of the first output terminals of the first multiplexer 11 has a pair of output ends, for example, the first output terminal ON1 has the output ends P1, P2, the first output terminal ON2 has the output ends P3, P4, and the first output terminal ON3 has the output ends P5, P6. The two output ends included in each of the first output terminals are electrically connected to the second control terminal and the second input terminal of the respective second multiplexer respectively.

For example, the second control terminal CN2 of the second multiplexer 12 is electrically connected to the output end P1 included in the respective first output terminal ON1, and the second input terminal IN2 of the second multiplexer 12 is electrically connected to the other output end P2 included in the respective first output terminal ON. The second control terminal CN2 of the second multiplexer 13 is electrically connected to the output end P3 included in the respective first output terminal ON2, and the second input terminal IN2 of the second multiplexer 13 is electrically connected to the other output end P4 included in the respective first output terminal ON2. The second control terminal CN2 of the second multiplexer 14 is electrically connected to the output end P5 included in the respective first output terminal ON3, and the of the second input terminal IN2 of the second multiplexer 14 is electrically connected to the other output end P6 included in the respective first output terminal ON3.

Each of the register circuits DV1-DV3 includes a plurality of register units R1-Rn, and each of the register circuits DV1-DV3 is electrically connected to a respective one of the second multiplexers 12-14, wherein each of the register units is electrically connected to a respective one of the second output terminals OP1-OPn of the respective second multiplexer. For example, the register circuit DV1 is connected to the respective second multiplexer 12, and the register units R1-Rn included in the register circuit DV1 are electrically connected to the second output terminals OP1-OPn of the second multiplexer 12 respectively. The register circuit DV2 is connected to the respective second multiplexer 13, and the register units R1-Rn included in the register circuit DV2 are electrically connected to the second output terminals OP1-OPn of the second multiplexer 13 respectively. The register circuit DV3 is connected to the respective second multiplexer 14, and the register units R1-Rn included in the register circuit DV3 are electrically connected to the second output terminals OP1-OPn of the second multiplexer 14 respectively.

In this embodiment, the first multiplexer 11 links (or enables/conducts a path between) the first input terminal IN1 and one of the first output terminals ON1-ON3 according to the address command ADDR, so as to send the input data to one of the second multiplexers 12-14. The second multiplexer, which receives the input data, links (or enables/conducts a path between) the second input terminal IN2 and one of the second output terminals OP1-OPn according to the input data, so as to access one of the respective register units R1-Rn.

In one embodiment, the input data includes a control instruction CMD, and the second control terminal of the second multiplexer receiving the input data receives the control instruction CMD from the respective output end. The second multiplexer links the second input terminal IN2 and one of the second output terminals OP1-OPn according to the control instruction CMD so as to access the respective register unit.

The case in which the baseboard management controller 2 plans to access the register unit R2 included in the register circuit DV1 is illustrated as an example. In this example, first of all, the I²C slave circuit 10 analyzes the data flow DAT sent from the baseboard management controller 2 to obtain the address message and the input data. The I²C slave circuit 10 determines that the address message included in the data flow DAT is responsive (or corresponding) to the predetermined address ADDR1 among the predetermined addresses. Accordingly, the I²C slave circuit 10 outputs the predetermined address ADDR1, to which the address message responsive, as the address command ADDR. The I²C slave circuit 10 also outputs the input data.

The first multiplexer 11 receives the address command ADDR via the first control terminal CN1 and receives the input data via the first input terminal IN1. The predetermined address ADDR1 is for indicating (or corresponding to) a path to the second multiplexer 12, which is the path between the first output terminal ON1 of the first multiplexer 11 and second multiplexer 12. Accordingly, the first multiplexer 11 links (or enables/conducts the path between) the first input terminal IN1 to the first output terminal ON1 according to the address command ADDR (namely the predetermined address ADDR1), so that the input data can be sent to the second multiplexer 12.

The second control terminal CN2 of the second multiplexer 12 receives the control instruction CMD included in the input data from the respective output end P1, and further the second multiplexer 12 links (or enables/conducts the path between) the second input terminal IN2 and the second output terminal OP2 according to the control instruction CMD so as to access the respective register unit R2. The access, as described in this example, includes reading the data from the register unit, or writing the data into the register unit.

More specifically, the operation of the complex programmable logic device 1 provided by the present disclosure can include the read or and the write mode depending on conditions. In practice, the control instruction CMD is not only used for switching the path from the second multiplexer to the register unit, but also used for indicating a read process or a write process is performed. In one embodiment, the complex programmable logic device 1 is operated in a read mode when the control instruction CMD is a read instruction. In the read mode, the complex programmable logic device 1 obtains a register value VAU by reading the respective register unit according to the control instruction CMD serving as the read instruction. In another embodiment, the complex programmable logic device 1 is operated in the write mode when the control instruction CMD is a write instruction. In the write mode, the complex programmable logic device 1 writes a register value VAU into the respective register unit according to the control instruction CMD serving as the write instruction.

That is, in the case in which the complex programmable logic device 1 is operated in the read mode, the input data obtained from the data flow DAT includes the control instruction CMD while the register value VAU is obtained by reading the respective register unit. In contrast, in the case in which the complex programmable logic device 1 is operated in a write mode, the input data obtained from the data flow DAT includes both of the control instruction CMD and the register value VAU, wherein the register value VAU can be written into the respective register unit.

As shown in FIG. 1, the complex programmable logic device 1 provided by the present disclosure uses a single $I^2C$ slave circuit 10. The complex programmable logic device 1 records and outputs the responsive current address by taking the advantage of the capability of multi-address response included in the single $I^2C$ slave circuit 10, with the responsive current address used for selecting a path for transmitting the input data having the control instruction CMD (and the register value VAU). Therefore, the single $I^2C$ slave circuit 10 is substituted for three independent $I^2C$ slave circuits in the conventional structure for reducing the device resource consumption and the configuration costs.

Figure 2:
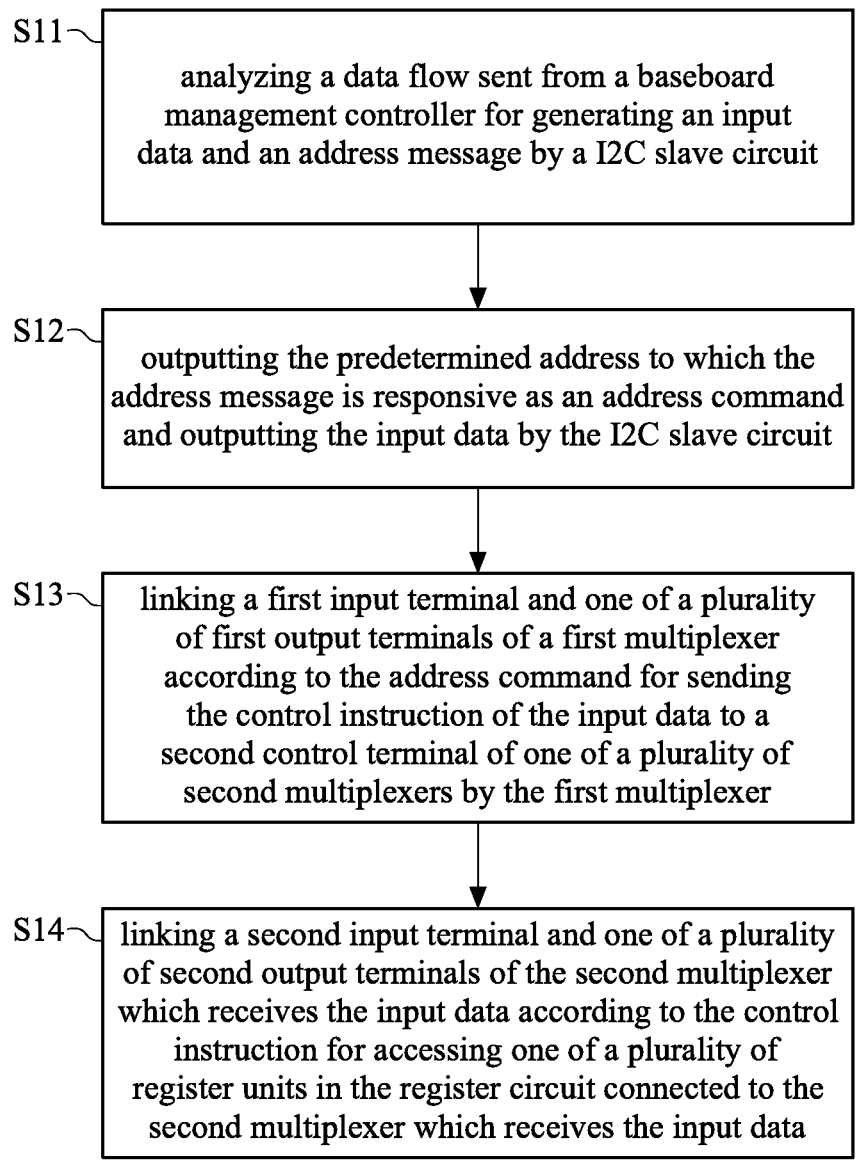
FIG. 2 is a flow chart of an operation method of a complex programmable logic device with a capability of performing a multi-address response according to one embodiment of the present disclosure.

Please refer to FIG. 2, which is a flow chart of an operation method of a complex programmable logic device with a capability of performing a multi-address response according to one embodiment of the present disclosure. The operation method shown in FIG. 2 is adapted to the complex programmable logic device 1 shown in FIG. 1. Please refer to FIG. 1 and FIG. 2, in step S11, analyzing the data flow sent from the baseboard management controller 2 for generating the input data including the control instruction and generating the address message by the $I^2C$ slave circuit 10, wherein the address message is responsive to one of the plurality of predetermined addresses. In step S12, outputting the predetermined address to which the address message is responsive as the address command ADDR and outputting the input data by the $I^2C$ slave circuit 10. In step S13, linking the first input terminal IN1 and one of the first output terminals ON1-ON3 of the first multiplexer 11 according to the address command ADDR for sending the control instruction CMD of the input data to the second control terminal CN2 of one of the second multiplexers 12-14 by the first multiplexer 1, wherein each of the second multiplexers 12-14 is electrically connected to a respective one of the register circuits DV1-DV3. In step S14, linking the second input terminal IN2 and one of the second output terminals OP1-OPn of the second multiplexer which receives the input data according to the control instruction CMD for accessing one of the register units R1-Rn included in the respective register circuit.

In one embodiment, when the control instruction CMD is a read instruction, reading the register value VAU from the respective register unit according to the read instruction by the complex programmable logic device 1.

In one embodiment, when the control instruction CMD is a write instruction, writing the register value VAU into the respective register unit according to the write instruction by the complex programmable logic device 1.

In view of the above descriptions, in the complex programmable logic device with the capability of multi-address response and operation method thereof, a plurality of predetermined addresses is set up in the $I^2C$ slave circuit, so that the address message included in the data flow from baseboard management controller is responsive to one of the predetermined addresses. The predetermined address to which the address message is responsive as the address command and the input data would be outputted so as to access the register unit. Thereby, by taking the advantage of the capability of multi-address response of the $I^2C$ slave circuit, the resource consumption of the complex programmable logic device is decreased and the number of codes of the complex programmable logic device is reduced so that the firmware maintenance is easy to be performed.

What is claimed is:

1. A complex programmable logic device with capability of performing multi-address response, comprising:
   a $I^2C$ slave circuit configured to analyze a data flow sent from a baseboard management controller for generating an address message and an input data, with the address message responsive to one of a plurality of predetermined addresses, and the $I^2C$ slave circuit outputting the predetermined address to which the address message is responsive as an address command and outputting the input data;
   a first multiplexer having a first control terminal, a first input terminal and a plurality of first output terminals, with the first control terminal and the first input terminal electrically connected to the $I^2C$ slave circuit, the first input terminal configured to receive the input data, and the first control terminal configured to receive the address command, each of the plurality of first output terminals having two output ends;

a plurality of second multiplexers, with each of the plurality of second multiplexers having a second control terminal, a second input terminal and a plurality of second output terminals, the second control terminal electrically connected to one of the two output ends of a respective one of the plurality of first output terminals, and the second input terminal electrically connected to the other one of the two output ends of the respective first output terminal; and a plurality of register circuits, with each of the plurality of register circuits comprising a plurality of register units and electrically connected to a respective one of the plurality of second multiplexers, each of the plurality of register units electrically connected to a respective one of the plurality of second output terminals of the respective second multiplexer;

wherein the first multiplexer links the first input terminal and one of the plurality of first output terminals according to the address command so as to send the input data to one of the plurality of second multiplexers, and the second multiplexers, which receives the input data, links the second input terminal and one of the plurality of second output terminals according to the input data, so that one of the plurality of register units of the register circuit connected to the second multiplexer which receives the input data is accessed.

2. The complex programmable logic device according to claim 1, wherein the input data comprise a control instruction, the second control terminal of the second multiplexer which receives the input data receives the control instruction from the output end, and the second multiplexer, which receives the input data, links the second input terminal and the one of the plurality of second output terminals according to the control instruction, so that the one of the plurality of register units of the register circuit connected to the second multiplexer which receives the input data is accessed.

3. The complex programmable logic device according to claim 2, wherein the control instruction is a read instruction, and the complex programmable logic device reads a register value from the register unit according to the read instruction.

4. The complex programmable logic device according to claim 2, wherein the control instruction is a write instruction, and the complex programmable logic device writes a register value into the register unit according to the write instruction.

5. An operation method of a complex programmable logic device with capability of performing multi-address response, comprising:

analyzing a data flow sent from a baseboard management controller for generating an input data and an address message by a I$^2$C slave circuit, with the input data comprising a control instruction, and the address message responsive to one of a plurality of predetermined addresses;

outputting the predetermined address to which the address message is responsive as an address command and outputting the input data by the I$^2$C slave circuit;

linking a first input terminal and one of a plurality of first output terminals of a first multiplexer according to the address command for sending the control instruction of the input data to a second control terminal of one of a plurality of second multiplexers by the first multiplexer, wherein each of the plurality of second multiplexers is electrically connected to a respective one of a plurality of register circuits; and linking a second input terminal and one of a plurality of second output terminals of the second multiplexer which receives the input data according to the control instruction for accessing one of a plurality of register units in the register circuit connected to the second multiplexer which receives the input data.

6. The operation method of the complex programmable logic device according to claim 5, wherein when the control instruction is a read instruction, reading a register value from the register unit according to the read instruction by the complex programmable logic device.

7. The operation method of the complex programmable logic device according to claim 5, wherein when the control instruction is a write instruction, writing a register value into the register unit according to the write instruction by the complex programmable logic device.

* * * * *